July 2, 1957  J. L. MONTGOMERY  2,797,911
ACCELEROMETER
Filed Oct. 17, 1951

INVENTOR
James L. Montgomery

United States Patent Office 2,797,911
Patented July 2, 1957

2,797,911

ACCELEROMETER

James L. Montgomery, Indianapolis, Ind.

Application October 17, 1951, Serial No. 251,781

5 Claims. (Cl. 264—1)

(Granted under Title 35, U. S. Code (1952), sec. 266)

The invention described herein may be manufactured and used by or for the Government of the United States of America for governmental purposes without the payment of any royalties thereon or therefor.

My invention relates to linear and angular accelerometers and particularly to an improvement in their mechanical and dynamic properties.

An object of my invention is to show a means of construction whereby it is possible to build an accelerometer having a smaller deflection for a fixed natural frequency and acceleration than has hitherto been possible.

A further object is to permit the natural frequency of an accelerometer to be lowered while at the same time holding the deflection constant for a given acceleration.

The use of the accelerometer improvements here disclosed are useful and desirable in accelerometers in which it is necessary or desirable to use the mechanical filtering ability of the accelerometer.

An object of my invention is to provide an accelerometer responsive to a small acceleration at a given frequency.

Another object of my invention is to provide an accelerometer which is preferentially responsive to low frequencies.

A further object of my invention is to produce an accelerometer in whose construction the natural frequency of response may be varied independent of the deflection and maximum acceleration.

Another object of my invention is to produce an accelerometer employing the angular inertia of two masses arranged so that their torques are mutually opposed and therefore at least partially self compensating.

Heretofore designers of accelerometers have assumed that it is good to measure all high frequencies of acceleration. There is a place for accelerometers of the type I described here to measure the accelerations of large aircraft in flight due to changes of navigation in which it is undesirable to have accelerations due to own ship vibrations affect the result. The frequency spectra of the two types of acceleration are separated sufficiently so that by using my method the output is mechanically filtered to attenuate the undesired high frequency spectrum of own ship vibration. It is thus possible to construct a whole new field of instrumentation around my invention.

It is the intention of the drawings and their description to show the spirit of the invention and it is intended to vary the actual construction considerably and retain the spirit of the invention.

My invention will be better understood from the following description taken in connection with the accompanying drawings and its scope will be pointed out in the appended claims.

Figure 1:
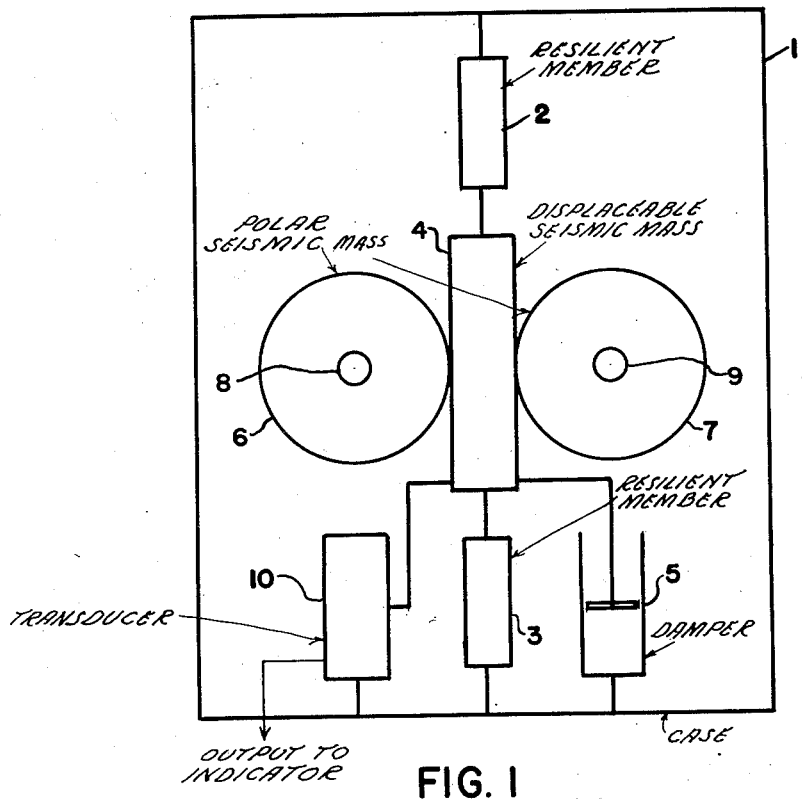

In the drawing, Fig. 1 shows diagrammatically the various parts of an accelerometer including the extra parts needed to illustrate an embodiment of my invention.

Figure 2:
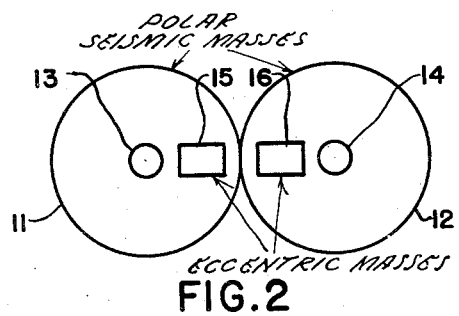

Fig. 2 shows an alternate arrangement for an accelerometer.

In general an accelerometer of the conventional design has a case or frame, such as that shown at 1 in Fig. 1, with a seismic mass, such as shown at 4 in Fig. 1, suspended between two restraining springs, such as springs 2 and 3 of Fig. 1 and an indicating means 10 connected to mass 4. These are the fundamentally essential elements of an accelerometer of the conventional type which may have refinements, such as guideways for mass 4 to freely slide in under the influence of the accelerating force and as a viscous damping device, such as shown at 5 in Fig. 1. The operation of this conventional system may be expressed by the differential equation (1) $$M\ddot{X}+F\dot{X}+KX=0$$

where:
M is the mass of 4
F is the dampening coefficient
K is the ratio of force to displacement
X is the displacement
$\dot{X}$ is the first derivative of the displacement with respect to time
$\ddot{X}$ is the second derivative of the displacement with respect to time The solution of this equation gives the undamped natural radian frequency $\omega$, as $$\omega=\sqrt{\frac{K}{M}}$$

and the dampening ratio, $\zeta$, as $$\zeta=\frac{F}{2\sqrt{MK}}$$

From Equation 1 it can also be seen that where the acceleration is constant and all transient forces have died out Equation 1 reduces to:

(2) $$M\ddot{X}=KX$$

since the dampening factor $F\dot{X}$ reduces to zero.

This equation, 2, gives a solution for the displacement X, $$X=\frac{M\ddot{X}}{K}$$

since $\ddot{X}$ is the acceleration $$X=\frac{M \text{ times the acceleration}}{K}$$

Such a conventional accelerometer has the limitation of being excessively large when constructed to have a low frequency response.

The construction of the present invention combines the linear acceleration of the seismic mass with the polar moment of inertia of two additional masses to provide a compact and practical construction for an accelerometer of low natural frequency.

Illustrated in Fig. 1 is a preferred embodiment of the invention in which 1 is the frame. Attached to the frame at one of their ends are two resilient members 2 and 3, which may be springs or electromagnetic devices. The other ends of the two resilient members are attached to the seismic mass shown at 4 to position the mass in its rest position. Also shown connected to the seismic mass 4 are a damping member 5 and a transducer 10. The damping member may be a fluid or a magnetic device, while the transducer may be any device for producing either a signal proportional to the displacement of the seismic mass or an indicating means and in practice may be a potentiometer, a variable resistance, a variable capacitor or other electromechanical means responsive to movement of the seismic mass. Connected to the seismic mass on two of its sides are two balanced masses 6 and 7 of equal polar moments of inertia which are rotatably mounted on pivots 8 and 9 which are fixed to the frame 1. Having the masses balanced and of equal polar moments of inertia makes the accelerometer insensitive to angular acceleration. These masses 6 and 7 may be disks or bars and have a positive connection to the mass 4 such as gear teeth on 6 and 7 engaging racks on 4 or by flexible bands attached at one end to the mass 4 and at their other ends to the one of masses 6 and 7 after one or more turns of the bands having been wrapped about the masses 6 and 7 respectively. It is also contemplated that mass 4 will be supplied with the necessary guides to insure linear movement with as small an amount of friction as possible (not shown).

The operation of such a system as described above may be expressed by a differential equation of the form:

$$(3) \quad M\ddot{X} + \frac{J}{r^2}\ddot{X} + F\dot{X} + KX = 0$$

where the symbols common to Equation 1 have the same meaning as in Equation 1 and where:

$J$ is the polar moment of inertia resulting from masses 6 and 7

$r$ is the effective radius of each of the masses 6 and 7. The phrase, effective radius, is defined as the radius measured vertically from the axis of the polar mass 6 or the polar mass 7 to the point of contact with linearly displaceable mass 4.

The solution of this equation gives $$(4) \quad \omega = \sqrt{\frac{K}{M + \frac{J}{r^2}}}$$

and $$\zeta = \frac{F}{2\sqrt{\left(M + \frac{J}{r^2}\right)K}}$$

where:

$\omega$ is the undamped natural radian frequency
$\zeta$ is the damping ratio

From these solutions it is apparent that the introduction of masses 6 and 7 will lower the natural frequency of response of the systems without affecting the size of mass 4 or increasing its displacement. That such is the result of utilizing the polar-moment-of-inertia masses 6 and 7 in the seismic mass system of Fig. 1 may be understood by referring to the Equation 4 of its natural frequency $\omega$. Thus, when the composite polar-moment-of-inertia (J) of masses 6 and 7 increases, the term $$\frac{J}{r^2}$$

in the denominator of Equation 4 becomes larger, thereby effectively reducing the magnitude of the resultant natural frequency $\omega$ of the seismic mass system.

A fundamental requirement for the seismic mass system of an accelerometer is that its natural frequency $\omega$ should have a value at least twice as great as the highest acceleration frequency to be measured. Thus, $\omega \geq 2f_{a(\max)}$, where $f_a$ represents acceleration frequency. Accordingly, where the highest frequency of acceleration to be measured is known, it is easy to determine the natural frequency of the seismic system required for an accelerometer which will be responsive to all frequencies of acceleration less than, or equal to, one-half as large.

From Equation 4 it is possible to derive a formula for the mass 4 of Fig. 1 expressed as a function of natural frequency $\omega$, polar-moment-of-inertia J, radius of contact $r$, and ratio of force to displacement of mass 4 (K). Hence, $$M = \frac{K}{\omega^2} - \frac{J}{r^2}$$

In addition, the formula for the composite polar-moment-of-inertia J of masses 6 and 7 may be derived from Equation 4. Thus, $$J = \frac{r^2 K}{\omega^2} - Mr^2$$

Likewise, a formula representative of the ratio of mass 4 with respect to the composite polar-moment-of-inertia J of masses 6 and 7 also may be derived from Equation 4 and expressed $$\frac{M}{J} = \frac{K}{J\omega^2} - \frac{1}{r^2}$$

It should be apparent that the foregoing formulae represent, inter alia, the structural relationship which must exist between the masses utilized in the exemplary embodiment represented in Fig. 1.

In operation the accelerometer of Fig. 1 is mounted in the device whose acceleration it is desired to measure in such a manner that the axis of mass 4 and springs 2 and 3 lies in the direction parallel to that component of motion whose acceleration it is desired to measure. The instrument will then respond to the acceleration present by a displacement of the seismic mass relative to the frame in proportion to the magnitude of acceleration. The damping member is introduced into the system to remove the undesirable vibrations within the seismic system and to assist in restricting the response of the system to the desired frequency range.

When the modification shown in Fig. 2 is considered, there is shown two interconnected rotatable masses 11 and 12 on parallel pivots 13 and 14, said pivots 13 and 14 being fixed to a frame (not shown). Mounted on at least one of the rotatable masses 11 and 12 is a second mass 15, if only one additional mass is used; or if both masses 15 and 16 are to be used they are applied to both rotatable masses 11 and 12 respectively.

It is to be understood that the disks 11 and 12 would replace disks 6 and 7 in Fig. 1 with mass 4 omitted to form a complete accelerometer. That is, there would be resilient members attached to the masses 11 and 12 tending to restore them to their rest position, along with the necessary indicating and damping devices.

When only mass 15 is employed, the two masses 11 and 12 are displaced angularly under acceleration with the component of the displacement corresponding to the linear acceleration being proportional to the cosine of the angle of the displacement. This arrangement is sensitive to both angular and linear acceleration. If the two masses 11 and 12 are of equal polar moments of inertia, and masses 15 and 16 have equal polar moments of inertia, then the accelerometer is sensitive only to linear acceleration. If the device is considered without the two masses 15 and 16, but with the disks 11 and 12 of unequal polar moments of inertia, then the operation of the device may be expressed by the differential equation:

$$(4) \quad J_1\ddot{\theta} + J_2\ddot{\theta} + F\dot{\theta} + K\theta = 0$$

where:

$J_1$ is the angular moment of inertia of mass 11
$J_2$ is the angular moment of inertia of mass 12
$\theta$ is the angular displacement
$\dot{\theta}$ is the 1st derivative of the angular displacement with respect to time or is the angular velocity
$\ddot{\theta}$ is the 2nd derivative of the angular displacement with respect to time or is the angular acceleration
$F$ and $K$ have the same meaning as in Equation 1

As a solution of this equation the natural radian frequency $$\omega = \sqrt{\frac{K}{J_1 + J_2}}$$

and the damping ratio $$\zeta = \frac{F}{2\sqrt{(J_1 + J_2)K}}$$

and for a constant angular acceleration $$\theta = \frac{J_1 - J_2}{K}$$

As in the case of the accelerometer of Fig. 1 the natural frequency can be made independent of the deflection and maximum acceleration.

What I claim as new and desire to secure by Letters Patent of the United States is:

1. An apparatus responsive to forces of acceleration to produce an output representative of the magnitude of the said forces comprising: means providing mechanical support; a yieldable resilient source of restraining force affixed to the said support means; a first seismic mass connected to the said resilient source, said seismic mass having opposite sides; two pivotal members rotatively mounted on the said support means; two polar moment-of-inertia seismic masses, each rotatively mounted on one of the said pivotal members and coupled to an opposite side of the first seismic mass such that displacement of the first seismic mass in response to an accelerating force will produce rotation of the said polar seismic masses in opposite directions, the dynamic balance of each of the said polar seismic masses being equal; means damping at least one of the said seismic masses; and means coupled to the said first seismic mass producing an output representative of the magnitude of an accelerative force operating on the first seismic mass.

2. An apparatus responsive to forces of acceleration to produce an output representative of the magnitude of the said forces comprising: means providing mechanical support; a yieldable resilient source of restraining force affixed to the said support means; a first seismic mass connected to the said resilient source, the said seismic mass having opposite sides; two pivotal members rotatively mounted on the said support means; a polar-moment-of-inertia seismic mass rotatively mounted on each of the said pivotal members; and means coupling each of said polar masses to an opposite side of the first seismic mass such that displacement of the first seismic mass in response to an accelerating force will produce rotation of the said polar masses in opposite directions, the dynamic balance of each of the said polar masses being equal.

3. In apparatus for producing a quantity proportional to a force of acceleration, the combination comprising: a seismic mass system responsive to accelerative forces of lower frequency and substantially unresponssive to accelerative forces of higher frequency made up of a first seismic mass (M), means resiliently supporting the first seismic mass (M) such that linear displacement occurs in response to a force of acceleration, and second and third polar seismic masses having a composite moment-of-inertia (J) in accordance with the structural relationship, $$J = \frac{Kr^2}{\omega^2} - Mr^2$$

wherein $r$ represents the effective radius of each of the said second and third seismic masses, $\omega$ represents the natural frequency required to make the said seismic mass system responsive to the range of acceleration frequencies to be measured, K represents the ratio of force to linear displacement of the said first seismic mass (M), and M represents the mass of the said first seismic mass; means rotatively coupling the said second and third seismic masses to the said first mass (M) such that displacement of the said first mass will produce rotation of the said second and third seismic masses in opposite directions; and means coupled to one of the aforesaid masses for transducing a physical displacement into a quantity representative of a force of acceleration acting on the said first mass.

4. In apparatus for producing a quantity proportional to acceleration, a combination comprising: a seismic mass system responsive to accelerative forces of lower frequency and substantially unresponsive to accelerative forces of higher frequency made up of a first seismic mass (M), means resiliently mounting the said first mass for linear displacement in response to a force of acceleration, second and third dynamically-balanced, polar-moment-of-inertia seismic masses having a composite moment-of-inertia (J) structurally related to the first seismic mass (M) in accordance with the ratio, $$\frac{M}{J} = \frac{K}{J\omega^2} - \frac{1}{r^2}$$

wherein $\omega$ represents the natural frequency of the seismic mass system and equals at least twice the highest frequency of acceleration to be measured by the said accelerometer, $r$ represents the effective radius of each of the second and third masses, M represents the mass of the said first mass, J represents the composite polar-moment-of-inertia of the said second and third masses, and K represents the ratio of force to linear displacement of the said seismic mass (M); means rotatively coupling the said second and third seismic masses in juxtaposition with the said first seismic mass, such that displacement of the last mentioned mass will produce angular displacement of the second and third masses in opposite directions; and means coupled at least to one of the aforesaid masses for transducing a physical displacement into a quantity representative of the force of the acceleration producing linear diplacement of the said first seismic mass.

5. An accelerometer comprising: means providing mechanical support; a first seismic mass having a first side and an opposite side; means resiliently mounting the said first seismic mass for displacement along a fixed linear path; two dynamically-balanced, polar-moment-of-inertia seismic masses rotatively mounted in the said support means such that one of the polar masses is physically contiguous with the said first side and the other one of the polar masses is physically contiguous with the said opposite side, thereby producing angular motion of the said polar masses in opposite directions whenever the said first mass is displaced; means coupled at least to one of the aforesaid masses for damping unwanted displacements; and means coupled at least to one of the aforesaid masses for transducing physical motion into an output quantity proportional to any force of acceleration which may exist along the linear displacement path of the said first seismic mass.

References Cited in the file of this patent

UNITED STATES PATENTS

| | | |
|---|---|---|
| 2,262,007 | Kollsman | Nov. 11, 1941 |
| 2,484,165 | Hathaway | Oct. 11, 1949 |
| 2,583,202 | Benson | Jan. 22, 1952 |
| 2,706,401 | Spaulding | Apr. 19, 1955 |

FOREIGN PATENTS

| | | |
|---|---|---|
| 320,361 | Great Britain | Oct. 10, 1929 |
| 340,841 | Germany | Sept. 19, 1921 |

OTHER REFERENCES

Aircraft Engineering, March 1930, pages 53 and 54.